(12) United States Patent
Bloch et al.

(10) Patent No.: US 7,526,561 B2
(45) Date of Patent: Apr. 28, 2009

(54) ENABLING ONLINE AND OFFLINE OPERATION

(75) Inventors: Eric D. Bloch, San Francisco, CA (US); Max D. Carlson, San Francisco, CA (US); Pablo Kang, San Francisco, CA (US); Christopher Kimm, San Francisco, CA (US); Oliver W. Steele, Brookline, MA (US); David T. Temkin, San Francisco, CA (US)

(73) Assignee: Laszlo Systems, Inc., San Mateo, CA (US)

( * ) Notice: Subject to any disclaimer, the term of this patent is extended or adjusted under 35 U.S.C. 154(b) by 166 days.

(21) Appl. No.: 11/608,717

(22) Filed: Dec. 8, 2006

(65) Prior Publication Data

US 2007/0078992 A1    Apr. 5, 2007

Related U.S. Application Data

(62) Division of application No. 10/105,787, filed on Mar. 25, 2002, now Pat. No. 7,275,105.

(60) Provisional application No. 60/349,671, filed on Jan. 16, 2002.

(51) Int. Cl.
*G06F 15/16* (2006.01)
*G06F 9/44* (2006.01)
*G06F 9/445* (2006.01)

(52) U.S. Cl. ................. 709/229; 717/178; 717/173

(58) Field of Classification Search ................. 709/203, 709/225, 227, 226, 229; 717/168–178
See application file for complete search history.

(56) References Cited

U.S. PATENT DOCUMENTS

| | | | |
|---|---|---|---|
| 6,035,324 A | 3/2000 | Chang et al. | |
| 6,546,425 B1 | 4/2003 | Hanson et al. | |
| 6,578,054 B1 | 6/2003 | Hopmann et al. | |
| 6,694,309 B2 | 2/2004 | Cho et al. | |
| 6,721,288 B1 | 4/2004 | King et al. | |
| 6,779,042 B1 * | 8/2004 | Kloba et al. | 709/248 |
| 7,089,284 B2 * | 8/2006 | Pardikar et al. | 709/203 |
| 2002/0069192 A1 | 6/2002 | Aegerter | |

OTHER PUBLICATIONS

J. Jing, "Client-Server Computing in Mobile Environments," ACM Computing Surveys, Jun. 1999, vol. 31, No. 2, pp. 117-157.

(Continued)

*Primary Examiner*—Larry D Donaghue
(74) *Attorney, Agent, or Firm*—Vierra Magen Marcus & DeNiro LLP

(57) ABSTRACT

The present invention provides software developers with the capability to create applications that can access information online and offline without having to program such capabilities into their applications. An application can gather information from various remote data sources via a network or other communication means, and still have access to all or a portion of that information when the computing device running the application is no longer connected to the network. In one embodiment, a client manages information access, caching and synchronization for the application. When connected, information accessed is stored in a local data store on (or near) the computing device. When disconnected, requests are run against the local data store instead of the remote data source. When reconnected, information is synchronized between the local data store and the remote data source.

19 Claims, 9 Drawing Sheets

OTHER PUBLICATIONS

H. Chang, "Web Browsing in a Wireless Environment: Disconnected and Asynchronous Operation in ARTour Web Express," Proc. of MOBICOM 97, Sep. 1997, pp. 260-269.

Floyd et al., "Mobile Web Access Using eNetwork Web Express," IEEE Personal Communications, pp. 47-52, Oct. 1998.

Mazer et al., "Writing the Web While Disconnected," IEEE Personal Communications, pp. 35-41, Oct. 1998.

Housel et al., "WebExpress: A System for Optimizing Web Browsing in a Wireless Environment," Proc. of the 2nd Annual Int. Conf. on Mobile Computing and Networking, pp. 108-116, 1995 ACM.

U.S. Appl. No. 11/608,721, filed Dec. 8, 2006.

* cited by examiner

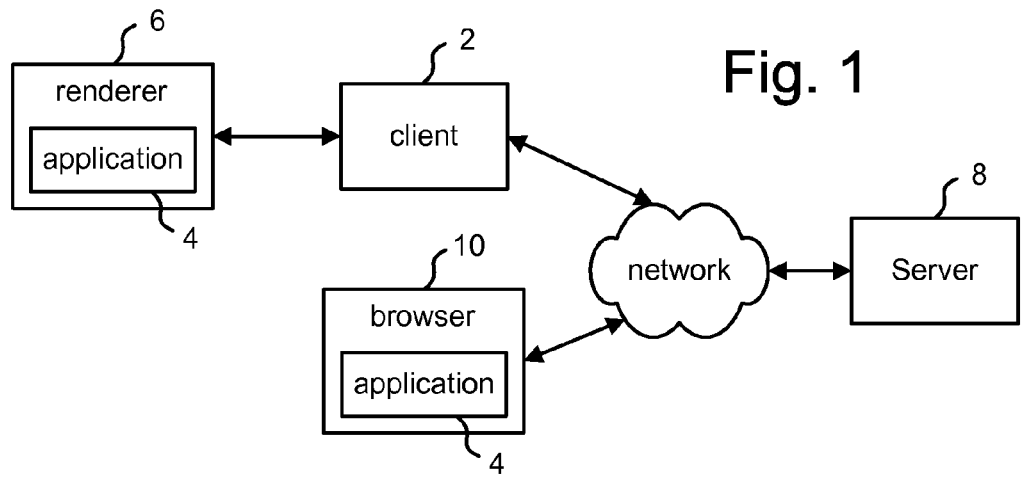
Fig. 1
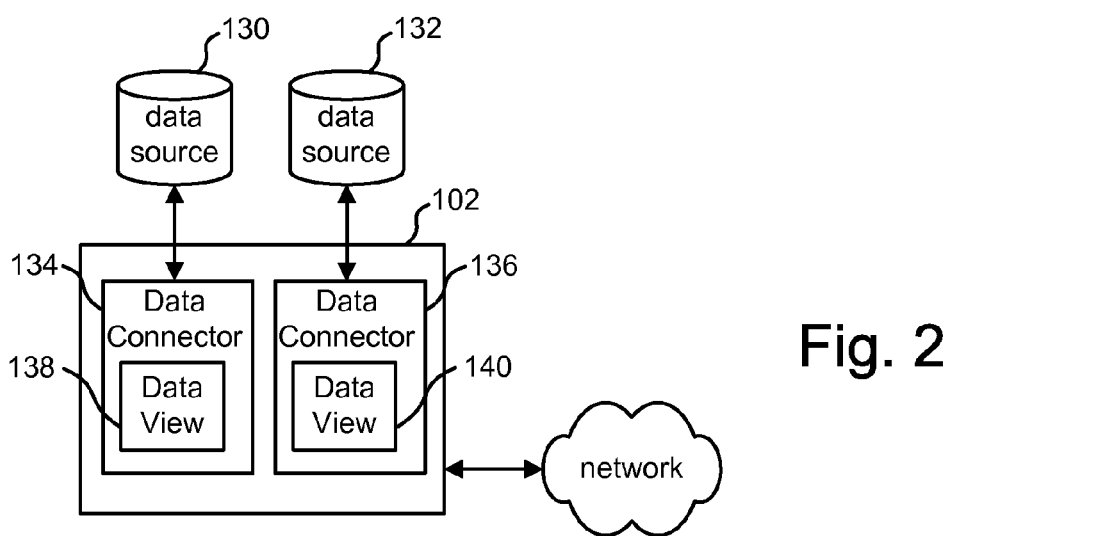
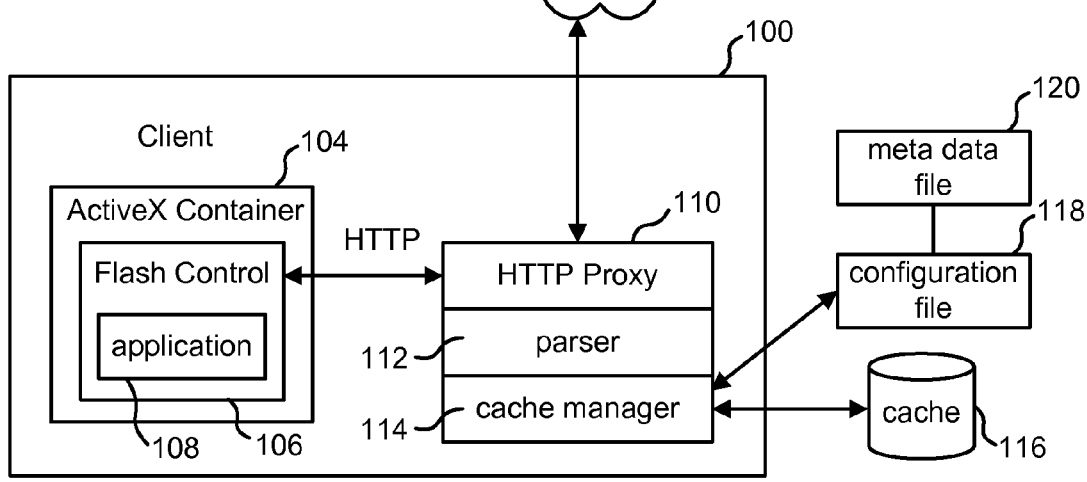
Fig. 2

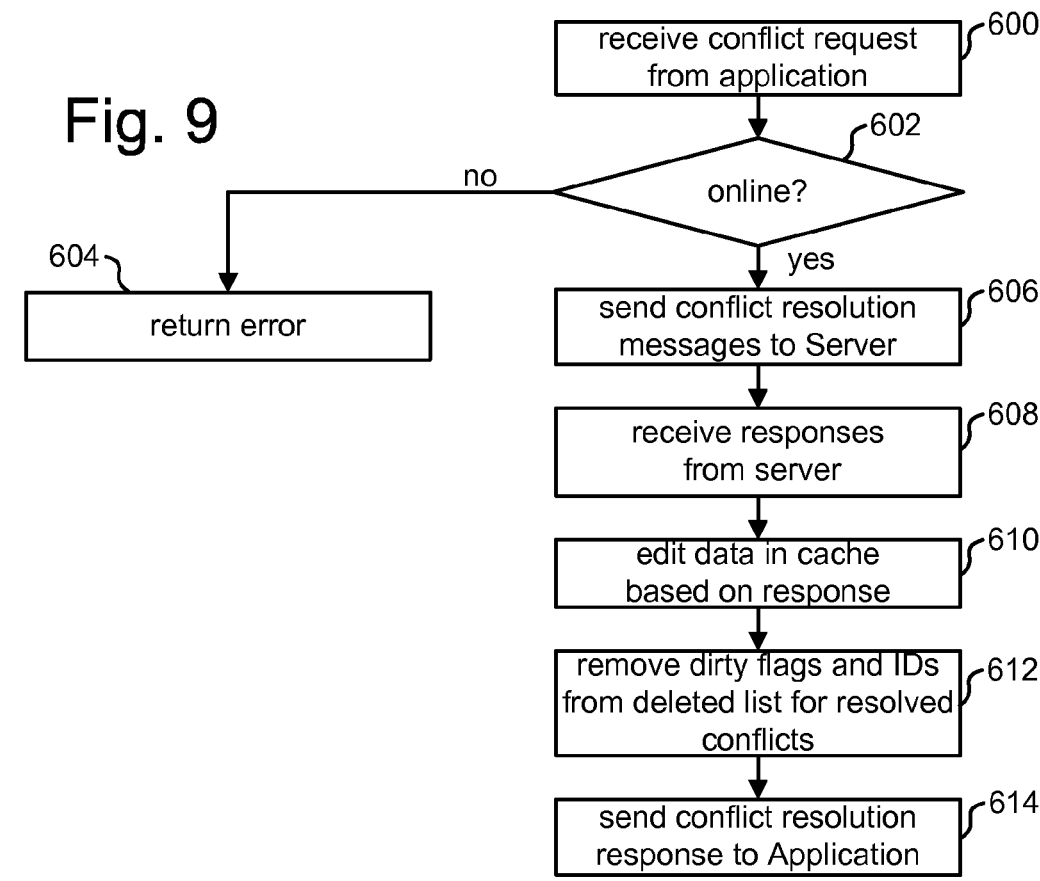
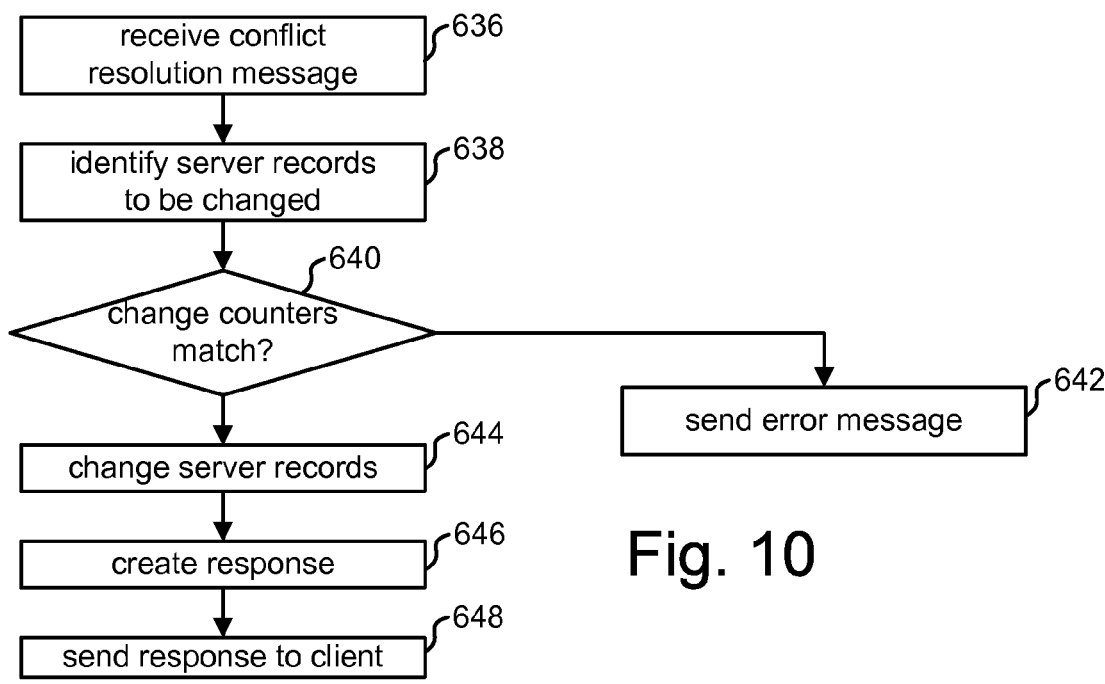

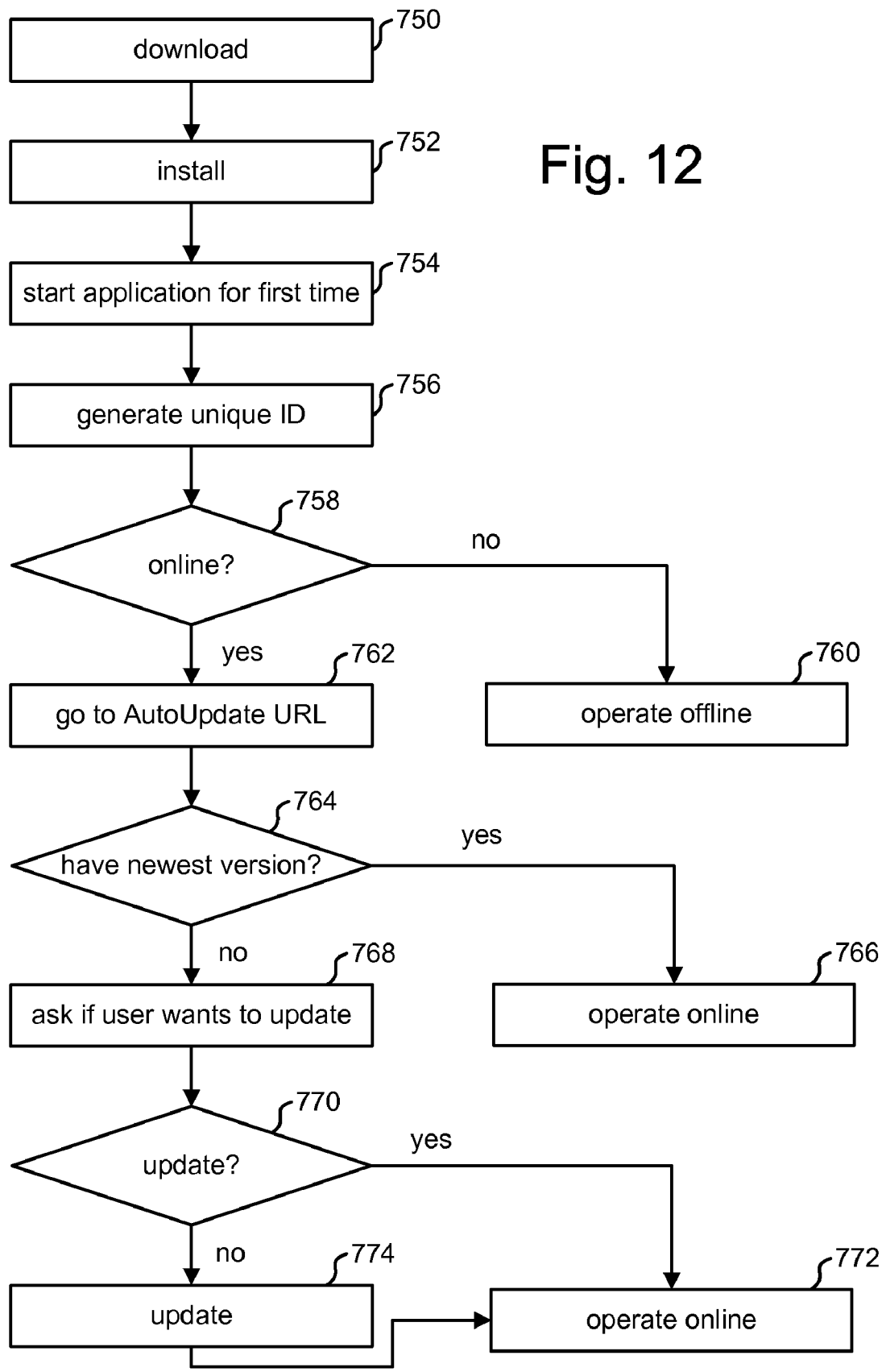

ENABLING ONLINE AND OFFLINE OPERATION

CROSS-REFERENCE TO RELATED APPLICATIONS

This application is a divisional of U.S. patent application Ser. No. 10/105,787, filed Mar. 25, 2002, titled "Enabling Online And Offline Operation," now U.S. Pat. No. 7,275,105, issued Sep. 25, 2007, which in turn claims the benefit of U.S. Provisional Application No. 60/349,671, entitled, "Interactive System," filed on Jan. 16, 2002, each of which is incorporated herein by reference.

This application is also related to the following Applications, each of which is incorporated herein by reference:

(1) "Interface Engine Providing A Continuous User Interface," by J. Bret Simister, Adam G. Wolff, Max D. Carlson, Christopher Kimm, and David T. Temkin, filed on Mar. 5, 2002 (application Ser. No. 10/092,360, publication no. 2003/0132959);

(2) "Presentation Server," by Eric D. Bloch, Max D. Carlson, Christopher Kimm, James B. Simister, Oliver W. Steele, David T. Temkin and Adam G. Wolff, filed on Mar. 5, 2002 (application Ser. No. 10/092,010, publication no. 2003/0195923); and (3) "Enabling Online And Offline Operation," by Eric D. Bloch, Max D. Carlson, Pablo Kang, Christopher Kimm, Oliver W. Steele and David T. Temkin, Ser. No. 11/608,721, filed herewith.

BACKGROUND OF THE INVENTION

1. Field of the Invention

The present invention is directed to technology for enabling an application, or other entity, to operate online and offline.

2. Description of the Related Art

The Internet has become very popular. Many people and businesses use the Internet to access data, applications, entertainment, productivity tools, and so on. One result of the popularity of the Internet is the rise in the use of network distributed applications. A network distributed application is a software application that runs on one or more servers and is delivered via a network to client devices as a "thin-client" application, which is actually "content" that runs within an application such as a Web browser. The network distributed application is typically not delivered to be a stand-alone installed desktop application.

Since network distributed applications, such as Web sites, are only accessible when network connectivity is available, applications that require off-line access are ordinarily developed and delivered as desktop applications. A desktop application, as opposed to a network distributed application, is installed on a device's hard disk (or other storage device) and can be programmed to run with or without network connectivity. Such applications are developed using completely different techniques and standards than server-based, network distributed applications.

Take, for example, the case of Microsoft Outlook®, a popular email application. In its standard version, it is implemented as a desktop application which is intermittently connected to a server. As a desktop application, it has its own application logic and maintains its own local database, separate from the server-resident database, and can work while connected to the network or not. This offers its users the convenience of accessing data such as email messages and contact information when off-line.

However, there are features offered by network distributed applications which are not available with desktop applications. A network distributed application can be used on any computer with a web browser and an Internet connection—and no desktop software need be installed in order to use it. The access-anywhere, zero-install features of network distributed applications may have driven Microsoft to offer its Outlook customers an alternative version of the application, called Outlook Web Access, which is a network distributed version of Outlook that allows an email server to be accessed like a web site.

These two versions of Outlook share many features and look very similar, but are implemented as two separate applications, with markedly different program structure and logic. There are no systems or tools which allow an application to be developed once, with a single code base, and delivered as both a desktop application (which can run on-line and off-line), and as a network distributed application. Currently, developers wishing to create an application that can work in both ways have no choice but to write custom code for each situation, with custom code for managing data synchronization issues between local and remote databases.

SUMMARY OF THE INVENTION

The present invention, roughly described, includes a system that provides software developers with the capability to create applications that can access information online and offline without having to program such capabilities into their applications. An application can gather information from various remote data sources via a network (or other communication means) and still have access to all or a portion of that information when the computing device running the application is no longer connected to the network. In one embodiment, a client manages information access, caching and synchronization for the application. When connected, information accessed from the remote data source is transparently stored in a local data store on (or near) the computing device. When disconnected, requests are run against the local data store instead of the remote data source. When reconnected, information is synchronized between the local data store and the remote data source. With such an arrangement, an application can be developed once, with a single code base, and delivered as both a desktop application (which can run on-line and off-line) and as a network-distributed application.

One embodiment of the present invention includes receiving a request at a client. The request is from an application which is separate from the client. The received request is a data request to read, write, modify or manage data stored in a first data source. The data request is forwarded from the client to a server, if the client is online. The server is in communication with the first data source and can cause the performance of the data request. Data is returned to the application via the client, which stores a copy of the data in a local data store. If the client is not online, then the client processes at least a portion of the data request using data stored in the local data store. The data in the local data store represents a local version of at least a subset of information stored in the first data source. Subsequent to processing the request when offline, the client responds to the application based on the data in the local data store.

Another embodiment of the present invention includes setting up a first application as a network distributed application and separately setting up the first application to operate with a client. Thus, there can be two installations of the same application, one as a network distributed application and one using the client as described above. The installation of the application using the client provides for the first application to request one or more services of the client, to run online by communicating with a server via the client, and to run off-line by using the client and a local data store.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In one embodiment, the software can be performed by one or more processors in communication with a storage device. In alternative embodiments, some or all of the software can be replaced by dedicated hardware including custom integrated circuits, gate arrays, FPGAs, PLDs, and special purpose processors. One example of hardware that can implement all or portions of the present invention includes a processor, storage devices, peripheral devices, input/output devices, displays and communication interfaces, in communication with each other as appropriate for the particular implementation.

The advantages of the present invention will appear more clearly from the following description in which the preferred embodiment of the invention has been set forth in conjunction with the drawings.

BRIEF DESCRIPTION OF THE DRAWINGS

FIG. 1 is a block diagram of an exemplar deployment according to the present invention.

FIG. 2 is a block diagram that depicts further details of the client and server according to one embodiment of the present invention.

FIG. 9 is a flow chart describing one embodiment of the process performed by the client to resolve conflicts with the server.

FIG. 10 is a flow chart describing one embodiment of the process performed by the server to resolve conflicts with the client.

FIG. 12 is a flow chart describing one embodiment for downloading and commencing the use of an application according to the present invention.

DETAILED DESCRIPTION

Figure 4:
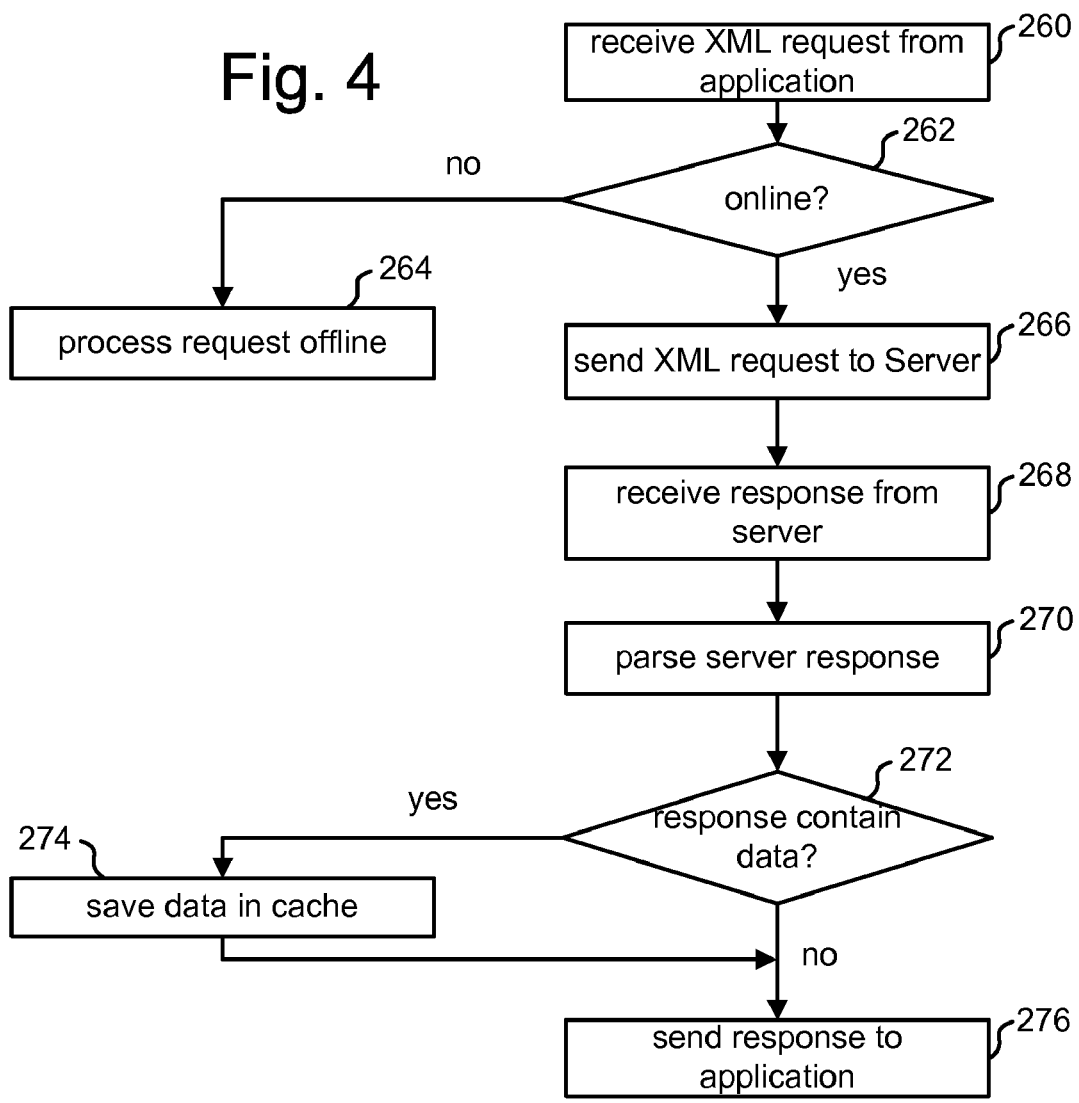
FIG. 4 is a flow chart describing one embodiment of the operation of the client.

FIG. 1 is a block diagram of one embodiment of the present invention. FIG. 1 shows client 2 in communication with renderer 6. For purpose of this document, a renderer is a software environment, hardware, a set of one or more software programs, etc. that can display graphics and/or play sound. One example of a suitable renderer is the Macromedia Flash Player. While the Flash Player is an appropriate vehicle for renderer 6, there is nothing inherent in the present invention that requires the Flash Player. Many other renderers can also be utilized. FIG. 1 shows application 4 inside renderer 6. That is, application 4 is an executable file that is performed by renderer 6. FIG. 1 also shows client 2 in communication with server 8 via a network. The network can be a LAN, WAN, dedicated connection, wireless network, Internet, Intranet, or other type of network. FIG. 1 also shows browser 10 in communication with server 8 via the network. Within browser 10 is application 4. In this mode, application 4 can run as a plug-in to browser 10 or can run as an input to a renderer, where the renderer is a plug-in to browser 10. For example, there is a Macromedia Flash plug-in for Microsoft's Internet Explorer, and application 4 can be a SWF file run by the Flash plug-in. SWF is the format for flash executable files. The installation of application 4 within browser 10 is one example of installing application 4 as a network distributed application. Other configurations of network distributed applications can also be used.

FIG. 1 shows that a single application can be installed to run as a network distributed application via browser 10 or can be installed to run with client 2. That is, the same application can be installed once in one capacity and can be installed again in a second capacity, concurrently or at different times. Application 4 running as a network distributed application can be set up in a manner known by those skilled in the art. One example of deploying application 4 as a network distributed application is provided in the patent application that was incorporated by reference above, titled "Presentation Server."

FIG. 2 is a block diagram that depicts further details of one embodiment of the present invention. FIG. 2 shows client 100 in communication with server 102 via the network. Client 100 is also in communication with cache 116 and configuration file 118. Furthermore, configuration file 118 is in communication with meta data file 120. Although FIG. 1 shows cache 116, other types of data stores can also be used.

FIG. 2 shows client 100 including ActiveX container 104. ActiveX container 104 includes Flash control 106, which includes application 108. ActiveX control 104 is an object instantiated by client 100. Within that object, Flash control 106 is another object. Within Flash control 106, an application object 108 is instantiated. Flash control 106 is in communication with HTTP proxy 110. HTTP proxy 110 serves as a proxy between application 108 and server 102. Also included in client 100 is parser 112 for parsing XML and SWF files (or other executable formats), and cache manager 114. Cache manager 114 is used to managed cache 116 and read from configuration file 118. Client 100 enables an application to be run on a user's computing device and use data while online and offline. Client 2 locally caches and synchronizes application data while online with server 102. Server 102 is a central point for data storage and synchronization. However, if the user does not have network access, an application will have access to all or a portion of the data through the client's local data store, which in one embodiment is a cache. Client 100 takes advantage of Macromedia's ActiveX interface for Flash to load in an application file (e.g., a SWF file). In other embodiments, it is contemplated that formats other than SWF will be used (e.g., if Flash is not used). ActiveX is one specific embodiment and there are other ways to embed the Flash player within an application (e.g., the Netscape plug-in API), and in the case of other players/rendering environments and other platforms, there will be more ways yet. In practice, a vendor will create a package that includes the client program and the application SWF.

FIG. 2 shows server 102 in communication with data source 130 and data source 132. A data source can be any source of data or anything that identifies a source of information. Examples of a data source include a file, a database, a directory, etc. FIG. 2 also shows more detail of a subset of components of server 102. Server 102 can be any type of server that can perform the functions described herein. One example of one appropriate server for the present invention can be found in United States Patent Application filed on Mar. 5, 2002, "Presentation Server," noted above and incorporated herein by reference. FIG. 2 shows server 102 including data connectors 134 and 136. Data connector 134 is in communication with data source 130. Data connector 136 is in communication with data source 132. The data connectors include software programmed to communicate with a data source. In one embodiment, there may be one data connector for each type of source (e.g., one data connector for an SQL database and another data connector for an LDAP directory). Other types of data connectors can also be used. In another embodiment, there may be one data connector for each data source, regardless of the format of the data. FIG. 2 also shows each data connector having a data view. For example, data connector 134 includes data view 138. Data connector 136 includes data view 140. A data view identifies a set of records (or other items) from a data source that can be accessed by an application. In other words, a data view describes a portion (or all) of a data source that will be used by the application. For example, in an SQL database, a data view can identify certain tables or certain records, etc. In order to allow the user to update records offline, data view definitions should not include overlapping fields. In one embodiment, a data view is a set of tabular records.

Data connectors must know how to connect to a data source; update, change, add, and delete records; and serialize the results into a flattened XML resultset. For instance, a JDBC data connector knows the specifics of how to instantiate a JDBC driver to talk to a SQL database and serialize results into a flattened XML resultset. The data connector may also have the capability to run queries against the resultset in the native language, translate proprietary queries into SQL queries and run them inside the SQL database.

Below is an exemplar data source configuration:

```
<datasource id="contacts" type="jdbc">
    <parameter name="username">max</parameter>
    <parameter name="password">myPass</parameter>
    <parameter name="hostname">10.10.20.4</parameter>
    <parameter name="port">3306</parameter>
    <parameter name="driver">org.gjt.mm.mysql.Driver</parameter>
    <dataview name="addresses">SELECT * FROM
    addresses</dataview>
    <dataview name="all">SELECT * FROM contacts
    WHERE ("userid" ==
    <expr>userid</expr>)</dataview>
</datasource>
```

In one embodiment, each data view definition is an XML-formatted string. Below are two example data view schema definitions:

The following static definition is sent to the server unchanged:

```
<dataview name="dataview_id">query expression with interspersed
<expr></expr>tags</dataview>
```

In the following dynamic definition, each <expr></expr> tag is evaluated by the application as a script expression before the definition is sent to the server:

```
<dataview name="dataview_id">query
    expression</dataview>
```

In the definitions above, the expression name="dataview_id" is a name used to determine which data view the query is run against. This id must be unique for each data view in a data source. The query expression is a data source specific request string. For example, if the data source was a SQL data source, this would be a SQL query. The following two examples illustrate the above discussion:

```
<dataview name="addresses">SELECT*FROM
    addresses</request>
```

This example selects all records in the 'addresses' table. This is an example of a straight forward data view definition. Another example of a data view definition is:

```
<dataview   name="all">SELECT   *   FROM   contacts
WHERE   ("userid  " ==   <expr>userid</expr>)</dataview>
```

This example, selects all contacts owned by this user, where the user id field in the database matches the application determined user id. Since this is a dynamic data view definition, the <expr>userid</expr> tag is evaluated in the application before the definition is sent to the server. This allows the application to specify a unique user id. In another embodiment, the client sends the expr tag unparsed and the server evaluates it.

In one embodiment, application developers will specify which fields or variables in an application map to which fields in a data source. This allows the application developer to name fields and labels as the developer sees fit, without having to change field names in the data source. For example, the developer's contact list application may have a column for name, e-mail and phone number. Below is an example mapping that could be used to automatically generate a listing with those columns:

```
<view datasource="contacts" dataview="all" query="allcontacts"
recordOffset="0">
    <layout type="simple" axis="x" spacing="0"/>
    <column label="Name" >
        <text recordOffset="0" field="displayname" />
        <text recordOffset="1" field="displayname" />
        <text recordOffset="2" field="displayname" />
    </column>
    <column label="Email" >
        <text recordOffset="0" field="email" />
        <text recordOffset="1" field="email" />
        <text recordOffset="2" field="email" />
    </column>
    <column label="Phone">
        <text recordOffset="0" field="phone" />
        <text recordOffset="1" field="phone" />
        <text recordOffset="2" field="phone" />
    </column>
</view>
```

An application can access data in a database using a query. Queries allow application developers to retrieve, add, and update records contained in data views. Queries also provide an easy way to reorder and sort data. Once the application developer has set up a data source and data views, they can add queries. Queries can be written in any type of query language. One example is an XML-based language that uses commands similar to SQL. The SQL language can also be used. While online, queries are invoked by the data connector. For offline operation, queries are run against cache 116, or another local data store.

For example, a common application requirement is to allow users to sort a list by clicking on column headers. Queries help accomplish this task by simplifying the results. Instead of generating a new request in the native query language (SQL, XSLT, etc.) for each column, the developer provides a simple query in a query language that can be common to all data connectors.

One type of query is a Change query. Change queries are for updating, adding or removing information from a data view. Below is an example format:

```
<query datasource="datasource_id" dataview="dataview_id"
 startid="recordid" limit="number">
    <change>
        <field name="fieldname" value="new value">
        <field name="fieldname2" value="new value">
    </change>
    <delete />
    <where>
        <or></or><and></and><not></not>
        <field name="fieldname" value="condition string">
    </where>
</query>
```

The "startid" identifies the first record to be returned from the resultset. The "limit" is used to limit the number of records returned from the resultset. The tag <change> specifies field(s) to be changed or added. For the <field name="fieldname" value="new value">, 'name' defines the field name to be changed or added, and 'value' defines the new value to be added/updated for that field. The <delete/> tag identifies records selected by the <where> clause to be deleted. Comparisons may be combined with nested <and>, <or> and <not> logical operators. All records are returned if no conditions are specified.

Below are examples of Change queries

Example (1) Change the records such that the first name becomes "Max" if the first name was "Maximilian"

```
<query datasource="contacts" dataview="all">
    <change>
        <field name="firstname" value="Max">
    </change>
    <where>
        <field name="firstname" value="Maximilian">
    </where>
</query>
```

Example (2) Delete the records where the first name is "Maximilian"

```
<query datasource="contacts" dataview="all">
    <delete/>
    <where>
        <field name="firstname" value="Maximilian">
    </where>
</query>
```

Change query resultsets have the following format:

```

    <status number="status code">Status message, if any</status>

```

Another type of query is the Select query. Select queries are for selecting records for retrieval from a data source. An example of a format for a Select Query is:

```
<query datasource="datasource_id" dataview="dataview_id"
 startid="recordid" limit="number">
    <select>
        <field name="fieldname">
    </select>
    <orderby desc="false">
        <field name="fieldname">
        <field name="fieldname">
        <field name="fieldname">
    </orderby>
    <where>
        <or>
            <and>
                <not>
                    <field name="fieldname" value="condition string">
                </not>
                <field name="fieldname" value="condition string">
            </and>
            <field name="fieldname" value="condition string">
        </or>
    </where>
</query>
```

The <select> tag specifies which fields will be selected from a data source and may contain one or more of the following: <field name="fieldname"> defines the name of the field selected on, and <orderby desc="false"> is used to specify whether the order of a resultset will be defined. The remaining tags are similar to those described above. Below are examples of Select queries:

Example (1) Select all records and return the first name

```
<query datasource="contacts" dataview="all">
    <select>
        <field name="firstname">
    </select>
</query>
```

Example (2) Select all records and return the first name, last name and telephone number, ordered ascending by last-name, then firstname, then phone:

```
<query datasource="contacts" dataview="all">
    <select>
        <field name="firstname">
        <field name="lastname">
        <field name="phone">
    </select>
    <orderby desc="false">
        <field name="lastname">
        <field name="firstname">
        <field name="phone">
    </orderby>
</query>
```

Example (3) Select all records and return the first name, last name, and telephone number where firstname begins with 'M', phone begins with '303', and id is greater than 5, ordered descending by last name, first name and then by telephone

```
<query datasource="contacts" dataview="all">
   <select>
      <field name="firstname">
      <field name="lastname">
      <field name="phone">
   </select>
   <where>
      <or>
         <and>
            <field name="firstname" value="M%">
            <field name="phone" value="303%">
         </and>
         <field name="id" value="gt 5">
      </or>
   </where>
   <orderby desc="true">
      <field name="lastname">
      <field name="firstname">
      <field name="phone">
   </orderby>
</query>
```

In one embodiment, the resultset of a Select query is in the following format:

```

<result id="1" resultfield1="result value 1" resultfield2="result value 2"...>

```

In addition to using data from a remote data store, it may be necessary for an application to store persistent data across sessions. An application may store data in name-value pairs using XML cookie requests. Set-cookie sets a cookie, get-cookie fetches a cookie and cookie is the application returned element with cookie data. All three elements must have app-id and path attributes defined. The app-id is the id of the requesting application and path is the location where the application developer wants to store the data. Furthermore, the set-cookie element takes a required max-age attribute, where max-age is the number of seconds since Jan. 1, 1970. Max-age determines how long an entry will live in the cookie cache. A max-age of 0 invalidates the entry.

The following describes the XML structure for set-cookie, get-cookie and cookie elements.

```
<set-cookie app-id="{applicationId}" path="{pathString}"
max-age="{maxAge}">
   [<data name="{name1}" value="{value1}" />]
   ...
   [<data name="{nameN}" value="{valueN}" />]
</set-cookie>
<get-cookie app-id="{applicationId}" path="{pathString}" />
<cookie app-id="{applicationId}" path="{pathString}">
   [<data name="{name1}" value="{value1}" />]
   ...
   [<data name="{nameN}" value="{valueN}" />]
</cookie>
```

The following is an example of the application lifecycle of setting, asking and receiving a cookie:

1. Application requests to set a cookie for "LZAPP01" with a maximum age of 9382342 seconds since Jan. 1, 1970 for "/" path:

```
<set-cookie app-id="LZAPP01" path="/" max-age="9382342">
   <data name="name" value="jenny" />
   <data name="phone" value="867-5309" />
</set-cookie>
```

2. Application requests cookie for application id "LZAPP01" for "/" path:

```
<get-cookie app-id="LZAPP01" path="/" />
```

3. Application receives cookie info for application id "LZAPP01" for "/" path:

```
<cookie app-id="LZAPP01" path="/">
   <data name="name" value="jenny" />
   <data name="phone" value="867-5309" />
</cookie>
```

Figure 3:
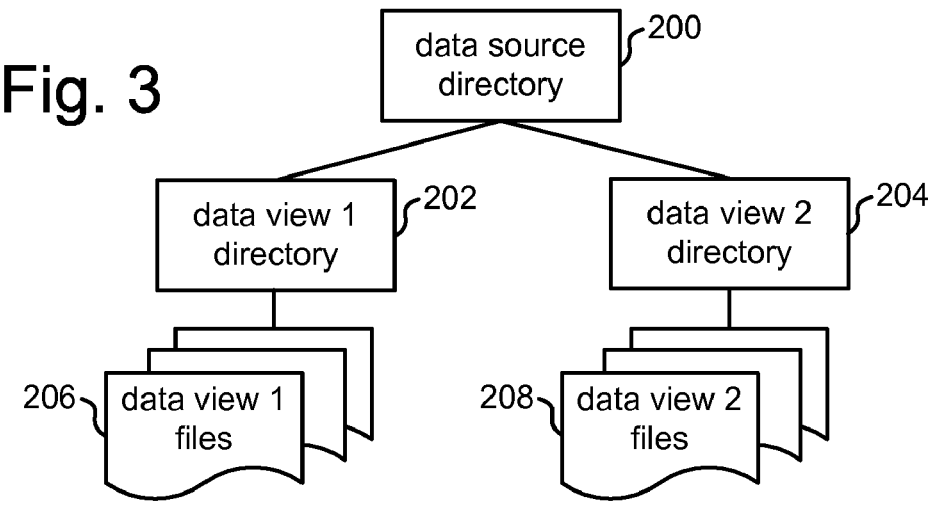
FIG. 3 is a block diagram of one embodiment of the structure of the cache.

FIG. 3 depicts an exemplary directory structure for one embodiment of cache 116. At the top of the structure is data source directory 200. Below data source directory 200 are data view 1 directory 202 and data view 202 directory 204. Below data view 1 directory 202 includes data view 1 files 206. Below data view 2 directory 204 is data view 2 files 208. In one embodiment, the cache is actually built up of several directories. Each top level cache directory is named after a data source. Underneath each top level directory exists directories named after data views. It is underneath the data view directories that the actual cache files exist. Additional files that may exist to help the cache manager search and update records include indexes to efficiently search through records, update lists, deleted ID lists inserted rollback files, modify-deleted rollback records and the server change counter. Indexes are b-trees with notes containing the appropriate records offset in the primary cache. The modified-deleted rollback files contain previous cache images of records that have been removed or updated by server changes. The inserted rollback file contains a list of inserted records that have been added to the cache. In case the server update doesn't complete successfully, all server "inserted" records are removed and "modified/deleted" records are rolled back into the cache. The update list has a list of updated records. The deleted ID list has a list of IDs for records erased from the cache when the client was offline. This list is sent to the server when the client synchronizes with the server. The server change counter is how the server knows which inserted, modified and deleted records it needs to send to the client on the next synchronization. Each change to a record on the server increments the server change counters. The new counter value is stored with the changed record. When a client asks for synchronization, it must send its version of the change counter to the server. The server then requests for all records that contain a change counter greater than the change counter of the client. When synchronization is completed, the server will send the current value of its change counter to the client.

Looking back at FIG. 2, client 100 interfaces with cache 116 according to configuration file 118. In one embodiment, configuration file 118 contains elements for client initialization. This file also includes paths to where the cache should reside and where the meta data file resides. Below is an example of a configuration file:

```
<Configuration>
  <Client>
    <SwfApp>C:\Program Files\Laszlo\app\latest\app.swf</SwfApp>
    <HTTP>
      <Port>8887</Port>
    </HTTP>
    <DataServer>http://www.usinglaszlo.com/DataServer</DataServer>
  </Client>
  <Cache>
    <Directory>C:\Program Files\Laszlo\cache</Directory>
    <Metadata>C:\Program Files\Laszlo\cache\meta.lzm</Metadata>
  </Cache>
</Configuration>
```

In the above example, the <SwfApp> identifies the location of application 108. The <Port> specifies the port to run under. The <DataServer> specifies the URL of server 102. The <Directory> specifies the location of the cache. The <Metadata> specifies the location of the meta data file.

An exemplar structure of a meta data files is:

```
<schema>
  <meta source="{dataSource}" view="{dataView}">
    <field name="{name}" type="{type}" length="{length}"
     [pk="[yes|no]"] [index="[yes|no]"] />
    ...
    <field name="{name}" type="{type}" length="{length}"
     [pk="[yes|no]"] [index="[yes|no]"] />
  </meta>
  ...
  <meta source="{dataSource}" view="{dataView}">
    <field name="{name}" type="{type}" length="{length}"
     [pk="[yes|no]"] [index="[yes|no]"] />
    ...
    <field name="{name}" type="{type}" length="{length}"
     [pk="[yes|no]"] [index="[yes|no]"] />
  </meta>
</schema>
```

The <meta source> identifies that the following meta data is for the particular data source and data view. The <field> is the meta data, with the following attributes:

Name: The name used for the field.

Type: Data type of column. Four types are supported: char (1 byte), integer (4 bytes), float (8 bytes), date (1 byte). The data type is passed in as a string but stored in the cache as an integer value defined as the number of seconds since "Jan. 1, 1970" GMT. The date structure looks like the following string structure: "YYYY/MM/DD HH:MM:SS TZZ", where the time is in 24-hour format and TZZ is a time zone.

Some date type examples:

2002/02/12 17:38:00 PST=Feb. 02, 2002, 5:38pm PST

2000/01/01 00:00:00 GMT=Jan. 01, 2000, 12am GMT

1972/08/14 12:00:00+5=Aug. 14, 1972, 12pm GMT+5

Length: Number of type elements to allocate in the database. All lengths default to 1. As an example, if the application developer knew that the max string length of a column was going to be 255 characters, the field would be defined as:

```
<field name="myColumn" type="char"
  length="255"/>
```

This would require only 255 bytes to store on disk, as type char is only 1 byte long.

Index: The index attribute flags this field to be indexed so as to provide a more efficient access to data.

Pk: Primary and foreign keys are the most basic components on which relational theory is based. Primary keys enforce entity integrity by uniquely identifying entity instances. Sometimes it requires more than one field to uniquely identify an entity. A primary key should not be a null value (a null value is one that has no value and is not the same as a blank). Because a primary key is used to identify a unique row in a relational table, its value should be specified and should not be unknown.

The metadata will be instantiated into a metadata object, which the client will reference during database access. Here's an example of what the object may look like:

```
enum Type = {
    TYPE_CHAR, TYPE_INT, TYPE_FLOAT, TYPE_DATE
};
struct Field
{
    Type m_type;
    int m_length;
    bool m_isIndexed;
    Field(Type type, int length = 1, bool isIndexed = false)
    {
        m_type = type;
        m_length = length;
        m_isIndexed = isIndexed;
    }
    /* Get disk allocation size for field instance.
    * @return allocation size.
    */
    int allocSize( )
    {
        return sizeOf(m_type) * m_length;
    }
    /* Static method to determine size of type in bytes.
    * @return size of type.
    */
    static int sizeOf(Type t)
    {
        switch (t) {
            case TYPE_CHAR: return 1;
            case TYPE_INT: return 4;
            case TYPE_FLOAT: return 8;
            case TYPE_DATE: return 4;
        }
    };
    typedef string Name;
    // Name: name of field.
    // Type: structure containing type and byte size.
    typedef map<Name, Field> Fields;
    // Name: name of data source.
    // Fields: map of field values.
    typedef map<Name, Fields> DataSources;
    // Map of cache metadata information.
    DataSources metaMap;
```

FIG. 4 is a flow chart describing the operation of client 100. When client 100 is online, requests from application 108 are forwarded to server 102. In this mode, client 100 acts as a proxy. Responses from server 102 are received at client 100 and parsed. Data in the responses is saved in the cache. Client 100 passes the response from server 102 to application 108 unchanged.

In step 260 of FIG. 4, client 100 receives a request from application 108. In one embodiment, the request is in XML format. The client determines whether it is online. If the client is not online (step 262), then the request is processed in an offline manner (step 264), which will be discussed below. If client 100 is online, then client 100 forwards the request to server 102. After sending the request, client 100 waits for a response. In step 268, client 100 receives a response from server 102. In one embodiment, the response is an executable file. If the renderer being used for the present invention is the Macromedia Flash Player, then the executable file will be in SWF format. With other renderers or other software, other types of executable files can also be used. In some embodiments, the response will not be an executable file. In step 270, client 100 parses the response received from server 102. If the response includes data (step 272), then that data is saved in cache 116 in step 274 and the response is sent to application 108 in step 276. If the response does not include data, then the response is sent to application 108 in step 276 without editing the cache.

Figure 5:
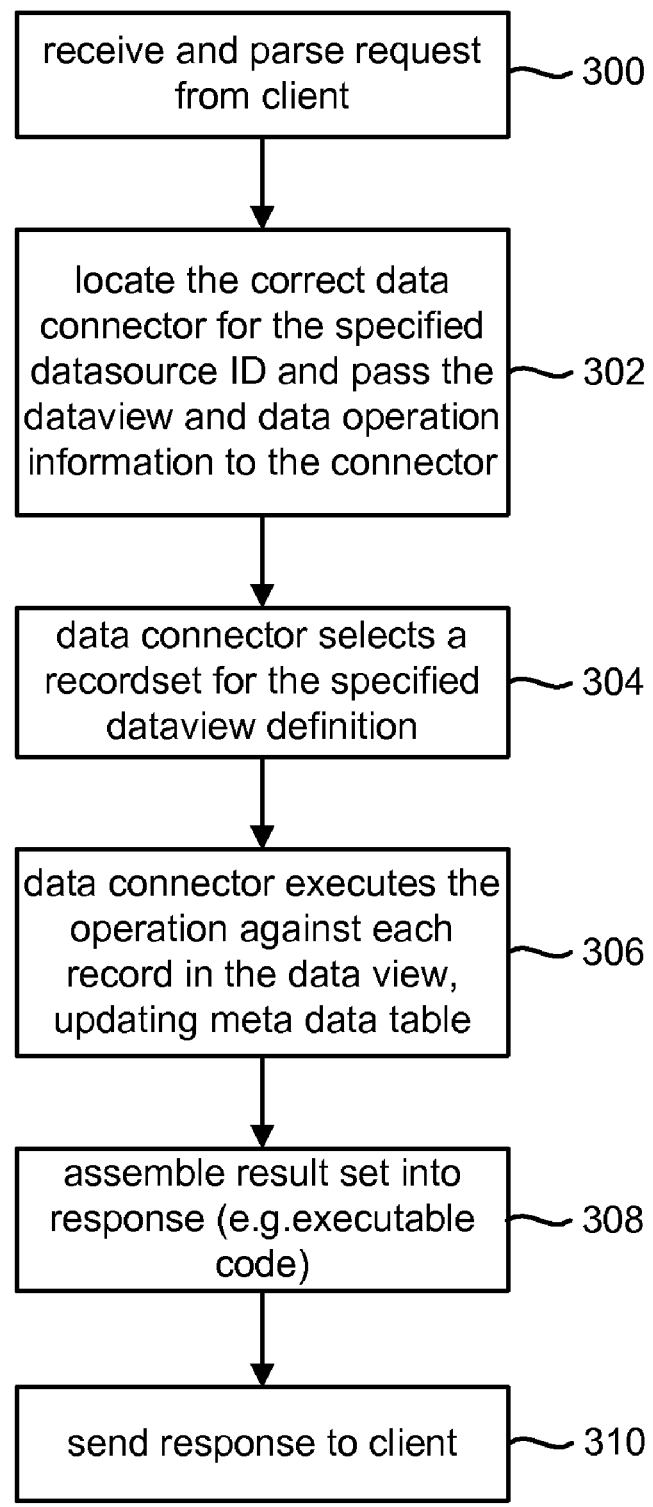
FIG. 5 is a flow chart describing one embodiment of the operation of the server.

FIG. 5 is the flowchart describing the operation of server 102, which occurs in response to receiving requests from client 100. In step 300, the request from the client is received and parsed. In step 302, the correct data connector is found through a specified data source ID. That data connector is passed the data view and data operation information from the server 102. In step 304, the data connector selects a record set from the specified data view definition. In step 306, the data connector executes the operation (e.g., read, write, edit, manage, etc.) against each record in the data view, updating any meta data tables. To support offline client functionality and synchronization, each data connector maintains a table of record meta data for each data source. This table is updated each time a record is changed. In one embodiment, the meta data includes a data view id, record id, counter and deleted flag. In step 308, the results are assembled into a response. In step 310, the response is sent back to client 100. In some embodiments, the server can indicate in the response whether data should be cached and for how long.

In an alternative embodiment, the present invention can be used with a notification model. This model works as previously described, except that the client is notified of server events. Anytime a server makes a change to one of the records in a relevant data source, the server notifies the client. The client may choose to ignore the message if the record doesn't exist in the cache. Even if the cache does store that record, the client may choose to not update it with the new values, opting for the user to pull it in subsequent requests.

In yet another environment, a client response model can be used. This model includes the client handling all application requests. As opposed to the server responding, the client response model has the advantage of handling requests without having to go through the network. Data changes in the server are sent through several event notifications. Upon receiving such an event, the client will request a "one-way sync from server" to receive server changes. Client changes will make a "one-way synch from client" so the server may receive its changes. The local cache will be in relative synchronization with the server. However, data may be stale during the period where the server has received an update but has not sent a change verification. The client response model works best with data records that exist in the cache. If the client was only working with the subset of what exists in the server and the application request data does not exist in the cache, the client will have to fetch the data from a server. Data will be removed from the cache if the disk space usage limit has been reached.

Figure 6:
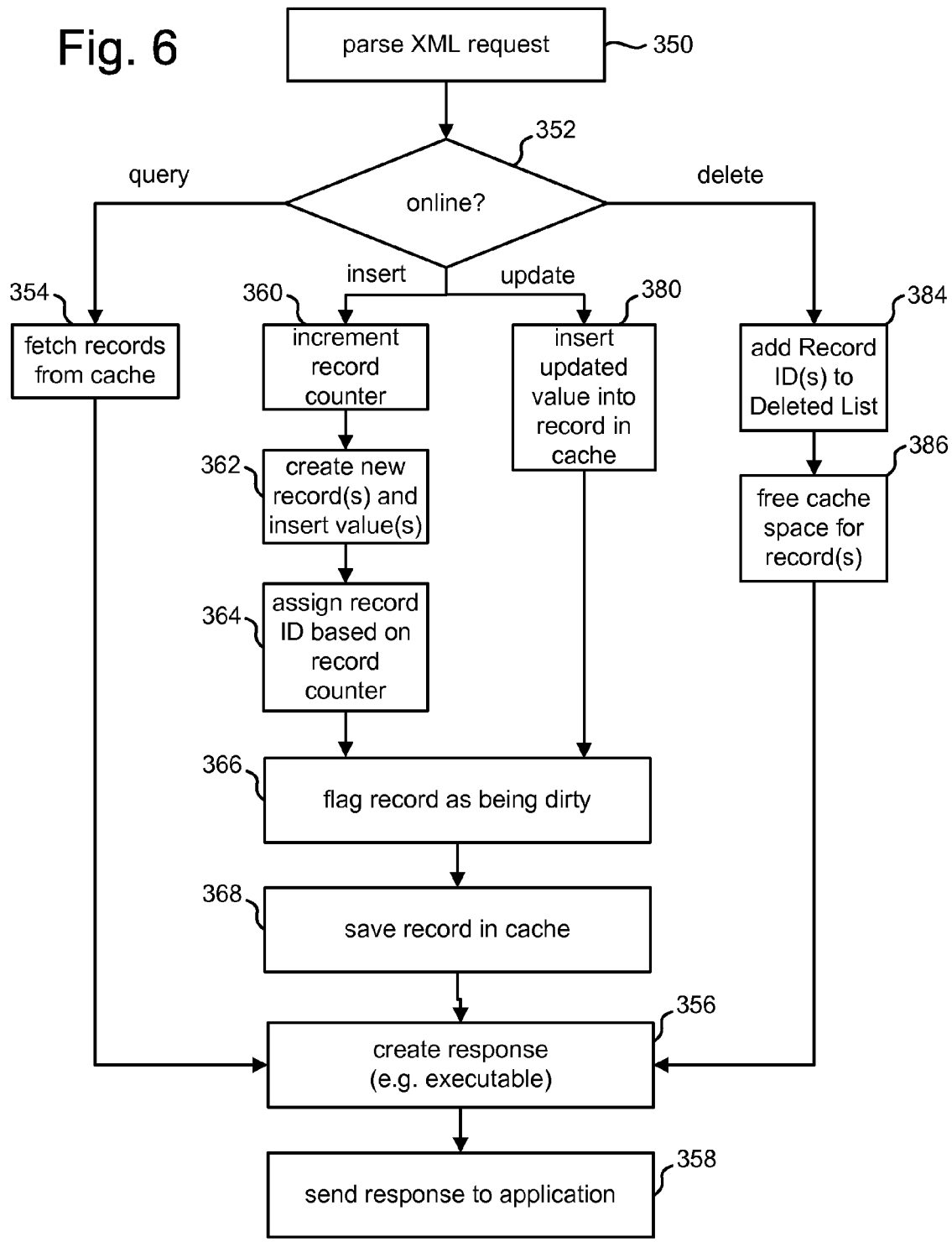
FIG. 6 is a flow chart describing one embodiment of the offline operation of the client.

FIG. 6 provides a flowchart describing the operation of client 100 when client 100 is offline. The process of FIG. 6 is performed during step 264 of FIG. 4. In step 350 of FIG. 6, client 100 parses the request. In step 352, client 100 determines whether the request is a data query, an insert (add new data), an update (edit data), or a delete operation. If the request includes a query, then the appropriate records are fetched from the cache in step 354. After fetching the records, a response is created in step 356. In one embodiment, the response is an executable file (e.g., SWF file format). In one option, the response includes a status of the operation. After creating the response, the response is sent to application 108 in step 358.

If, in step 352 of FIG. 6, it is determined that the request included an insert operation, then client 100 increments its internal record counter in step 360. Client 100 keeps a record counter so that it can keep track of and accurately identify each new record created. Each time step 316 is performed, the counter is incremented by one so that each new record has a unique identification. In step 362, the new record is created with the data provided in the request. In step 364, a record ID is assigned to this new record. The record ID is the new value of the record counter. In one embodiment, the record ID can pertain to the old value of the record counter depending on when the record counter is incremented. In step 266, the newly created record is flagged as being dirty. In step 368, the newly created record is saved in cache 116. In step 356, the response is created. In step 358, the response is communicated to application 108.

If, in step 352, it is determined that the request includes an update operation, then in step 380 the appropriate record in the cache will be edited to include the updated value. After step 380, the method proceeds at step 366.

If, in step 352, it is determined that the request includes a delete operation, then the record ID for the record being deleted is added to the deleted list, which includes a list of IDs of deleted records. In step 386, the space in the cache for the record is freed and the method continues at step 356.

While client 100 is online, application 108 can request that client 100 be synchronized with server 102. In other words, cache 116 will be synchronized with the appropriate data sources. Note that it is contemplated that many applications may be accessing server 102 and its associated data sources. In one embodiment, an application can request synchronization after a user instructs the application to request synchronization. In other embodiments, the software application can automatically determine whether to perform a synchronization operation.

Figure 7:
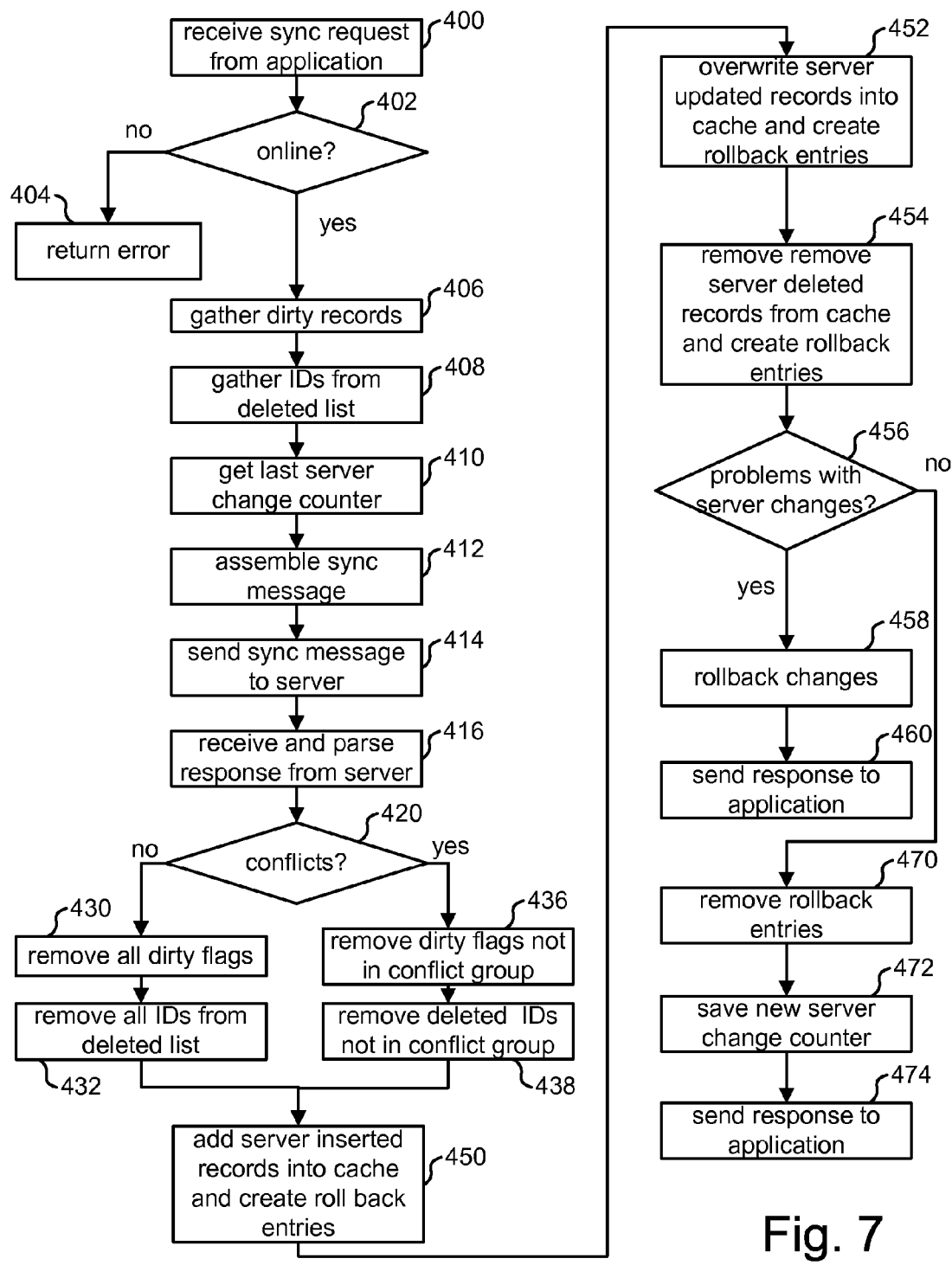
FIG. 7 is a flow chart describing one embodiment of the process performed by the client to synchronize with the server.

FIG. 7 provides a flowchart describing one embodiment of the operation of the client during synchronization. In step 400, client 100 receives a synchronization request from application 108. In step 402, client 100 determines whether it is online. If it is not online, then it returns an error in step 404. If client 100 is online, then in step 406 the client gathers all the dirty records in the cache. In step 408, client 100 gathers all the IDs from the deleted list. In step 410, client 100 accesses the last server change counter it received. In step 412, client 100 assembles a sync message. In step 414, client 100 transmits the sync message to the server. Below is an example of a format suitable for a sync message:

```
<sync changecounter="server-side change counter" datasource=
  "datasource"dataview="dataview descriptor string">
  <change>
    <record id="recordID" fieldname="proposed new value"
    fieldname2="proposed new value".../>
    ...
  </change>
  <delete>
    <record id="recordID of deleted record">
    ...
  </delete>
</sync>
```

In step 416 of FIG. 7, client 100 receives and parses a response from server 102. In step 420, client 100 determines whether the response indicates the existence of conflicts between the data sources and the cache. If there are no conflicts, then in step 430 all dirty flags are removed so that the records associated with dirty flags are no longer dirty. In step 432, client 100 removes all IDs from the deleted list. If there were conflicts (step 420), then in step 436 client 100 removes dirty flags for all records that were dirty and are not in the conflict group. In step 438, IDs that are not in the conflict group are removed from the deleted list. In step 450, non-conflicting server inserted records are added into the cache and rollback entries are created. In step 452, non-conflicting records that have been updated on the server are updated in the cache accordingly, and rollback entries are created. In step 454, non-conflicting records that were deleted on the server are deleted in the cache and rollback records are created. The rollback records indicate the operation and are used in case the set of operations do not complete without error. In step 456, it is determined whether there were any problems with any of the changes. If there are problems with the changes, then the changes are rolled back in step 458 using the rollback entries. After step 458, a response is sent back to the application indicating that there was a problem with the changes in step 460. If there were no problems with the changes, then in step 470 the rollback entries are deleted and all the new changes are saved in step 472. In step 474, a response is sent to the application indicating the changes that were made. In one embodiment, the response sent to application 108 includes an identification of all the conflicts. It is then up to application 108 to decide how to resolve the conflicts. In one embodiment, the application can present a dialog box (or other user interface) to the user indicating the conflicts and let the user choose how to resolve the conflicts. In another embodiment, the application can include logic for automatically resolving the conflicts.

Figure 8:
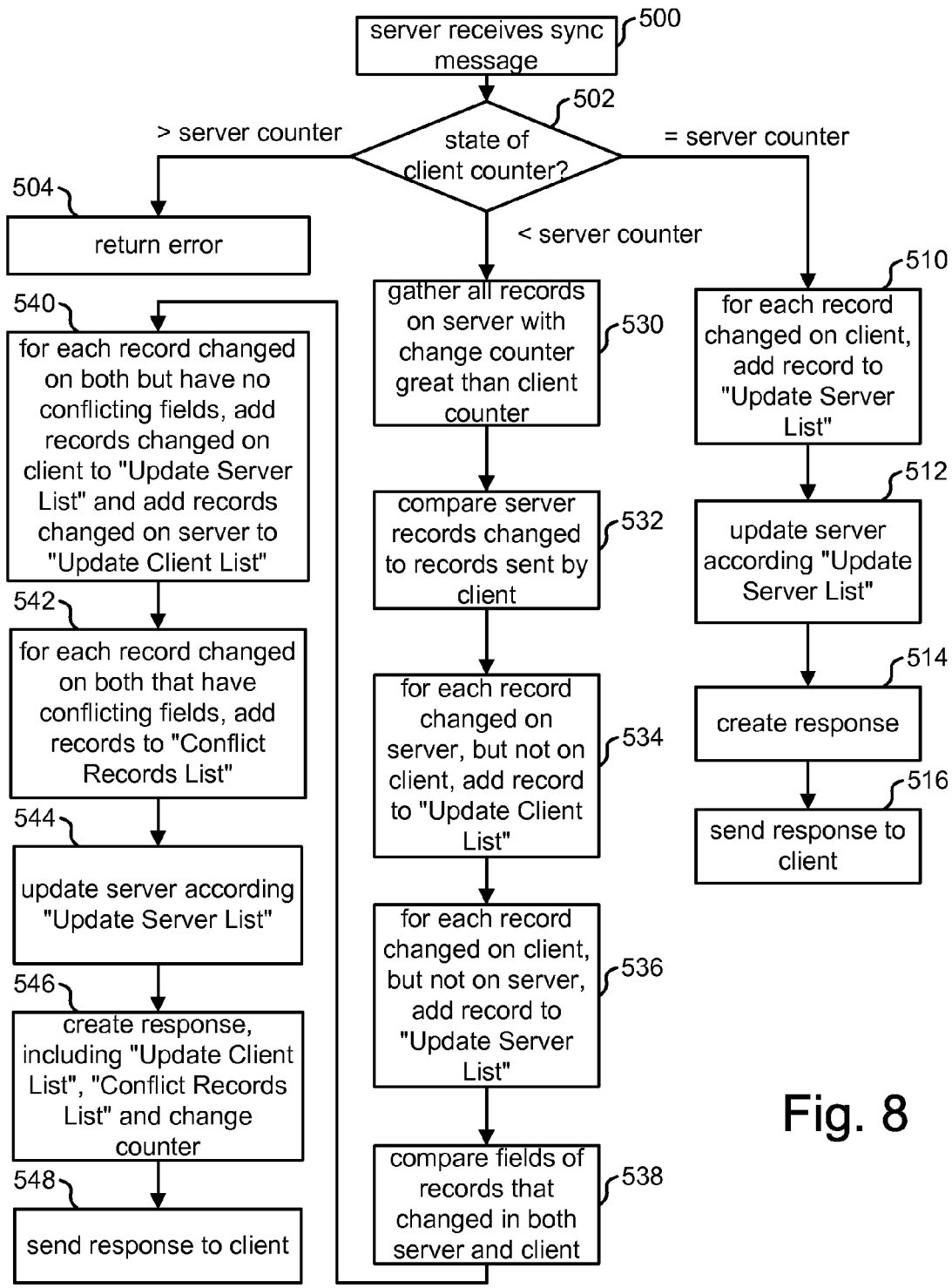
FIG. 8 is a flow chart describing one embodiment of the process performed by the server to synchronize with the client.

FIG. 8 is a flowchart describing the process that the server performs during synchronization. In step 500, server 102 receives a sync message from client 100. In step 502, server 102 determines the state of the client's version of the server change counter. If the client's version of the change counter is greater than the server's version, then in step 504 an error is returned. If the client's version of the change counter is equal to the server's version of the change counter, then there have been no changes on the server (e.g., no changes to the data sources) since the last synchronization. Thus, in step 510, each record change on the client is added to an "Update Server List." In step 512, the server is updated according to the "Update Server List." In step 514, server 102 creates a response, which indicates the status of the changes. In step 516, that response is sent to the client.

If the client version of the change counter is less than the server's version of the change counter, then it is assumed there were changes on both the client and the server. There is a possibility there were only changes on the server. In step 530, server 102 gathers all records on the server (e.g., records in data sources) that are associated with a change counter value that is greater than the client's version of the change counter. In step 532, all the records gathered in the previous step are compared to records changed by the client. For each record changed on the server but not on the client, add that record to the "Update Client List" in step 534. In step 536, each record changed on the client, but not on the server, is added to the "Update Server List." In step 538, the server compares fields of records that are changed on both the server and the client in order to determine whether there are any conflicts. In step 540, for each record changed on both the client and the server, but not having conflicting fields, add records changed on the client to the "Update Server List" and add records changed on the server to the "Update Client List." In step 542, for each record changed on both the client and the server that have conflicting fields, add those records to a "Conflict Records List." In step 544, the server is updated according to the "Update Server List." In step 546, a response is created that includes the "Update Client List," the "Conflict Record List," and the current value of the server's change counter. In step 548, that response is sent to client 102.

One example of a message that can be sent by server 102 to client 100 indicating a conflict can send the complete record for both deleted and changed records. An exemplar format is:

```
<sync>
    <status code="status code" />
    <problem datasource="datasource" dataview="dataview descriptor string">
        <record id="recordID of changed record" changecounter="server-side change counter for this record">
            <client type="update/delete" fieldname="server-side value for conflicting field" fieldname2="server-side value for conflicting field" ...>
            <server type="update/delete" fieldname="server-side value for conflicting field" fieldname2="server-side value for conflicting field" ...>
        </record>
    </problem>
</sync>
```

FIG. 9 is a flowchart describing a process performed by client 100 during conflict resolution. As discussed above, the application is responsible for deciding how to resolve conflicts. In step 600, client 100 receives a conflict request from application 108. That conflict request should instruct the server and client how to resolve conflicts. In step 602, client 100 determines whether it is online. If the client is not online then an error is returned to the application in step 604. If the client is online, then in step 606 the client sends a batch of resolution messages to the server, one for each record for which a conflict is being resolved. Below is an exemplar format of a resolution message:

```
<sync>
    <status code="status code" />
    <resolution datasource="datasource" dataview="dataview descriptor string">
        <change>
            <record id="recordID" changecounter="server-side change counter for this record" fieldname="new value for conflicting field" fieldname2="new value for conflicting field".../>
            ...
        </change>
        <delete>
            <record id="recorded to delete" changecounter="server-side change counter for this record">
            ...
        </delete>
    </resolution>
</sync>
```

In step 608, client 100 receives a confirmation response from server 102 confirming server side changes. This response or multiple responses allow client 100 to commit changes and remove dirty flags from changed records. An exemplar format for the confirmation response is:

```
<sync>
    <status code="status code" />
</sync>
```

In step 610, client 100 will edit data in its cache based on the conflict request. It is contemplated that the response(s) from the server will indicate to the client whether the server was able to do everything instructed of it, and whether the client should proceed with everything instructed of the client. Based on the response from the server, the client will perform whatever instructions are in the conflict request in step 610. In step 612, dirty flags will be removed from data that is no longer dirty because of the conflict being resolved. Additionally, IDs from the deleted list may be removed from the deleted list once the record is properly deleted in accordance with the conflict request. In step 614, the response from the server is forwarded to the application. In one embodiment, step 614 also includes appending a response from the client to the response from the server to create a combined response for the application. In another embodiment, the client can send a response separate from or instead of the response from the server.

FIG. 10 is a flowchart describing the process performed by the server to resolve conflicts. In step 636, the server receives the resolution message(s) forwarded to it from the client. In step 638, the server identifies records in the various data sources that need to be changed in response to the instructions in the conflict resolution message. In step 640, the server determines whether the change counter for the record to be changed matches the value of the change counter in the conflict resolution message. If not, this means that the server side record has changed again and the server then sends an error message in step 642 to the client indicating so. This error message will be forwarded by the client to the application so that the application can decide how to proceed. If, in step 640, if it is determined that the change counters match, then the method proceeds to step 644. In step 644, those records that have to be changed are edited. In step 646, a response is created that indicates whether the edits were made successfully. In step 648, a response is sent back to the client.

Figure 11:
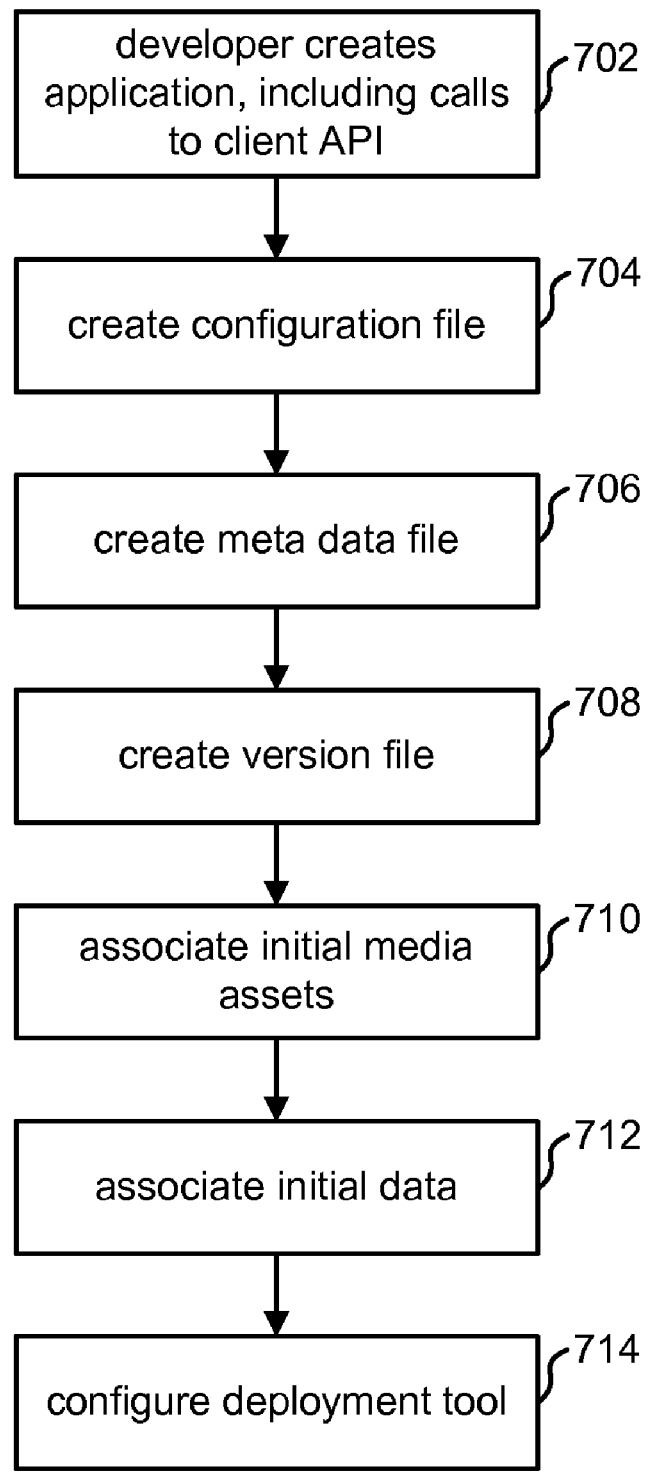
FIG. 11 is a flow chart describing one embodiment for creating an application according to the present invention.

Looking back at FIG. 2, client 100 is associated with application 108. FIG. 11 describes a flowchart describing a process for creating and bundling an application with the client in accordance with one embodiment of the present invention. In step 702, a software developer creates an application. This application will include calls to a client API. In one embodiment, it is contemplated that client 100 will include a set of library routines with an API. The application can use any of the services of the client by calling the appropriate function via the API. The application will also include calls to a server API to implement the functionality described above. In step 704, a configuration file is created. In step 706, a meta data file is created. In step 708, an XML based version file is created. The version file indicates the current version number of the application and an AutoUpdate URL. The AutoUpdate URL is a URL that is used to check for newer versions of the application. When a client goes online, it can check for updates to the application via a HTTP request to the AutoUpdate URL that includes the current client-side version number. If an update is available, the client downloads a new version file. In step 710, a developer may include a set of initial media assets. For example, an application may require video, audio, etc. In step 712, initial data is associated. An application developer may want to populate cache 116 with initial data so that a user can start using the application immediately regardless of whether the user's online or offline. In step 714, a deployment tool is configured which bundles the application, client, configuration file, meta data file, version file, media assets and data. In one embodiment, the deployment tool includes a .zip file and/or an application installer. The bundled software can then be posted in a file online or with any other means for deploying.

FIG. 12 is a flowchart describing one embodiment for downloading and commencing the use of the application according to one embodiment of the present invention. In step 750, the application, bundled with the client and the other files, is downloaded to the user's computing device. Note that the user's computing device can be a desktop computer, mobile computer, handheld computer, cellular telephone, or any other computing device. In step 752, the application, client and other files are installed. In step 754, the application is started for the first time. As part of the process of starting the application for the first time, the application generates a unique ID to identify itself in step 756. The combination of this unique ID, plus the record numbers described above, provide each record of data with a unique ID with respect to a particular server. That is, a server may be in communication with thousands of applications. Since each application will have its own ID, each record for each particular application will have a unique ID when combined with the application ID. In one embodiment, the ID is used by the client in all communications to the server. In step 758 of FIG. 12, the client determines whether it is online. If the client is not online, then in step 760 the client operates offline as described above. The application operates the same whether it's online or offline because the application merely communicates with the client, and it's up to the client to determine whether operation is online or offline, and to change behavior accordingly. If the client determines that the client is online, then in step 762 the AutoUpdate URL is used to determine whether there is a newer version of the application (step 764). If there is not a newer version, then the system will operate online in step 766. If there is a newer version, then the user will be asked whether the user wants to update to the newer version. In some embodiments, the user will not be asked and the application will update automatically. If the user indicates a preference to update the application (step 770), then the application is updated to the new version in step 774. In one embodiment, updating to the new version includes downloading new software and installing the new software. Updating may also include creating a new cache and either deleting the contents of the old cache or transferring the data from the old cache to the new cache. After updating the new version, or if the application is not updated, the system then operates online in step 772. In one embodiment, if the user doesn't want to update the application, the user may be prevented from using the application.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for enabling an application to work offline or online, comprising the steps of:

setting up a previously created first application as a network distributed application; and setting up said previously created first application to operate with a client separate from said first application including providing for said first application to request one or more services of said client, said step of setting up said first application to operate with said client being separate from said step of setting up said first application as a network distributed application, said first application runs online by communicating with said server via said client and runs off-line by using said client and a local data store.

2. The method of claim 1, wherein said step of setting up said first application to operate with said client comprises the steps of:
creating a configuration file;
creating version information; and
associating media.

3. The method of claim 1, further comprising the steps of:
downloading said first application with said client to a location remote from said server;
installing said first application and said client at said location remote from said server;
generating an ID for said client, said ID is unique with respect to said server;
optionally updating said first application if a newer version exists; and
operating said first application and client offline and online.

4. The method of claim 1, further comprising the steps of:
operating said first application as a network distributed application;
operating said first application online by communicating with said server via said client; and
operating said first application off-line by using said client and said local data store.

5. A method for deploying software, comprising the steps of:
setting up a first application as a network distributed application; and
setting up the first application to operate with a client including providing for the first application to access one or more services of the client, to run online by communicating with a server via the client and to run off-line by using the client and a local data store, the step of setting up the first application as a network distributed application being separate from the step of setting up the first application to operate with the client.

6. The method of claim 5, wherein:
the step of setting up the first application as the network distributed application and the step of setting up the first application to operate with the client result in two installations of the same application.

7. The method of claim 5, wherein:
the step of setting up the first application to operate with the client comprises setting up the first application as a desktop application which can run online and offline.

8. The method of claim 5, wherein:
the step of setting up the first application to operate with the client comprises setting up an executable file that is performed by a renderer.

9. The method of claim 5, wherein:
the step of setting up the first application as a network distributed application comprises setting up the first application for use with a browser.

10. The method of claim 5, wherein:
a request from the first application is forwarded to the server via the client when the client is online.

11. The method of claim 5, wherein:
the first application accesses the one or more services of the client by providing a call to an API of the client.

12. The method of claim 5, wherein the step of setting up the first application to operate with the client comprises:
creating a configuration file;
creating version information; and
associating media.

13. The method of claim 5, further comprising:
downloading the first application with the client to a location remote from the server;
installing the first application and the client at the location remote from the server;
generating an identifier for the client, the identifier is unique with respect to the server;
updating the first application if a newer version exists; and
operating the first application and client offline and online.

14. The method of claim 5, further comprising:
operating the first application as a network distributed application;
operating the first application online by communicating with the server via the client; and
operating the first application off-line by using the client and the local data store.

15. One or more processor readable storage devices having processor readable code embodied thereon, the processor readable code for programming one or more processors to perform a method comprising:
setting up a first application as a network distributed application; and
setting up the first application to operate with a client including providing for the first application to access one or more services of the client, to run online by communicating with a server via the client and to run off-line by using the client and a local data store, the client receives a request from the first application and, when the client is online, the client forwards the request to the server and passes a corresponding response from the sever to the first application, and when the client is offline, the client responds to the first application using the local data store, the step of setting up the first application as a network distributed application being separate from the step of setting up the first application to operate with the client.

16. The one or more processor readable storage devices of claim 15, wherein:
the step of setting up the first application to operate with the client comprises setting up the first application as a desktop application which can run online and offline.

17. The one or more processor readable storage devices of claim 15, wherein:
the step of setting up the first application to operate with the client comprises setting up an executable file that is performed by a renderer.

18. The one or more processor readable storage devices of claim 15, wherein:
the step of setting up the first application as a network distributed application comprises setting up the first application for use with a browser.

19. The one or more processor readable storage devices of claim 15, wherein:
the first application accesses the one or more services of the client by providing a call to an API of the client.

* * * * *